United States Patent [19]

Moorefield

[11] Patent Number: 5,192,037
[45] Date of Patent: Mar. 9, 1993

[54] DOUBLE-PIVOTING DEPLOYMENT SYSTEM FOR AEROSURFACES

[75] Inventor: William J. Moorefield, St. Peters, Mo.

[73] Assignee: McDonnell Douglas Corporation, St. Louis, Mo.

[21] Appl. No.: 749,316

[22] Filed: Aug. 23, 1991

[51] Int. Cl.$^5$ .......................... F42B 10/14; B64C 3/56
[52] U.S. Cl. ................................... 244/46; 244/3.28; 244/3.29; 244/49
[58] Field of Search ................... 244/3.24, 3.25, 3.26, 244/3.27, 3.28, 3.29, 46, 49

[56] References Cited

U.S. PATENT DOCUMENTS

| | | | |
|---|---|---|---|
| 3,063,375 | 11/1962 | Hawley et al. | 244/3.27 |
| 3,643,599 | 2/1972 | Hubich | 244/3.27 |
| 4,323,208 | 4/1982 | Ball | 244/3.28 |
| 4,336,914 | 6/1982 | Thomson | 244/3.27 |
| 4,588,146 | 5/1986 | Schaeffel, Jr. et al. | 244/3.27 |
| 4,664,339 | 5/1987 | Crosfield | 244/3.28 |
| 4,667,899 | 5/1987 | Wedertz | 244/3.24 |
| 5,035,378 | 7/1991 | Spanovich | 244/49 |

Primary Examiner—Galen Barefoot
Assistant Examiner—Virna Lissi Ansley
Attorney, Agent, or Firm—Timothy H. Courson; Benjamin Hudson, Jr.

[57] ABSTRACT

A double-pivoting deployment system for aerosurfaces, such as wings or fins, for use on aerospace vehicles. Each aerosurface has an inner segment and an outer segment. The inner segment is pivotally connected at a first axis of rotation to the support structure of the aerospace vehicle. An outer side portion of the inner segment is pivotally connected at a second axis of rotation to an inner side portion of the outer segment. In operation, the outer segment is stowed adjacent to the body of the aerospace vehicle such that the surface plane of the outer segment is longitudinally aligned with the longitudinal axis of the aerospace vehicle, and the aerosurface span is longitudinally aligned with, the longitudinal axis of the aerospace vehicle. From the stowed position, the outer segment is first rotated substantially 90° about the second axis of rotation so that the surface plane of the outer segment is generally horizontal; subsequently, the entire aerosurface is rotated about the first axis of rotation so that aerosurface span projects outwardly from the body of the aerospace vehicle.

8 Claims, 4 Drawing Sheets

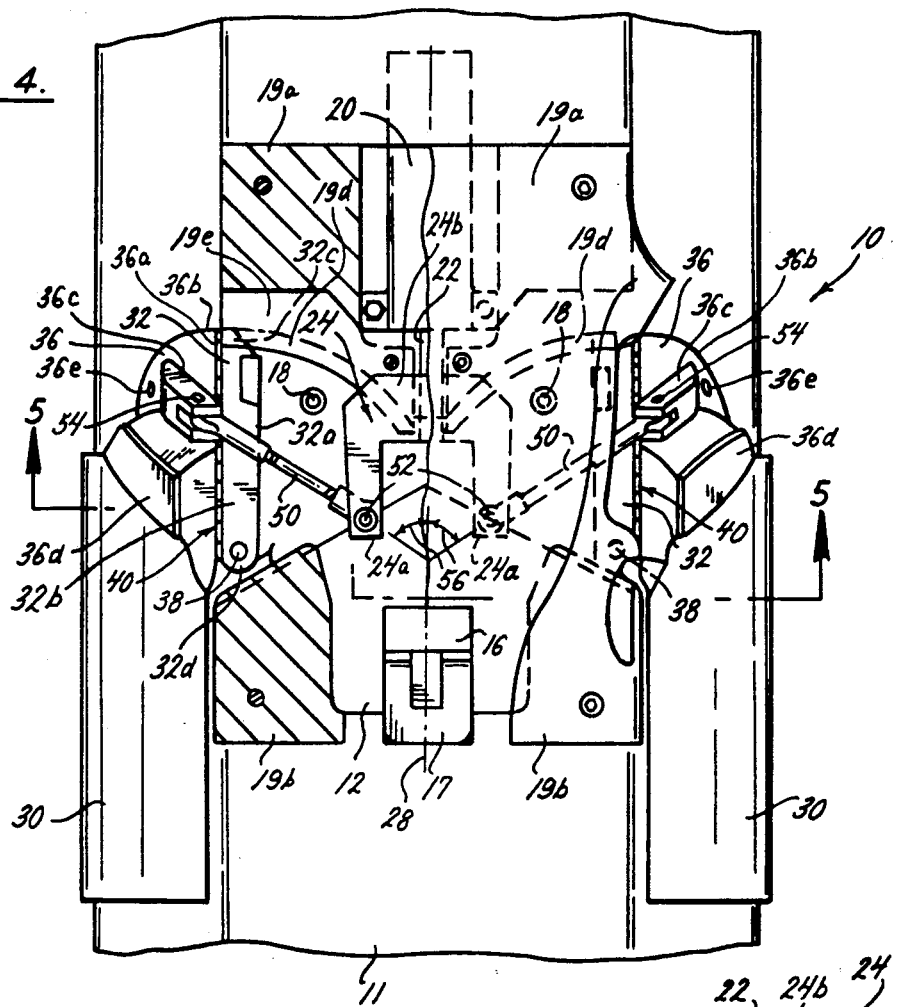
FIG. 4.
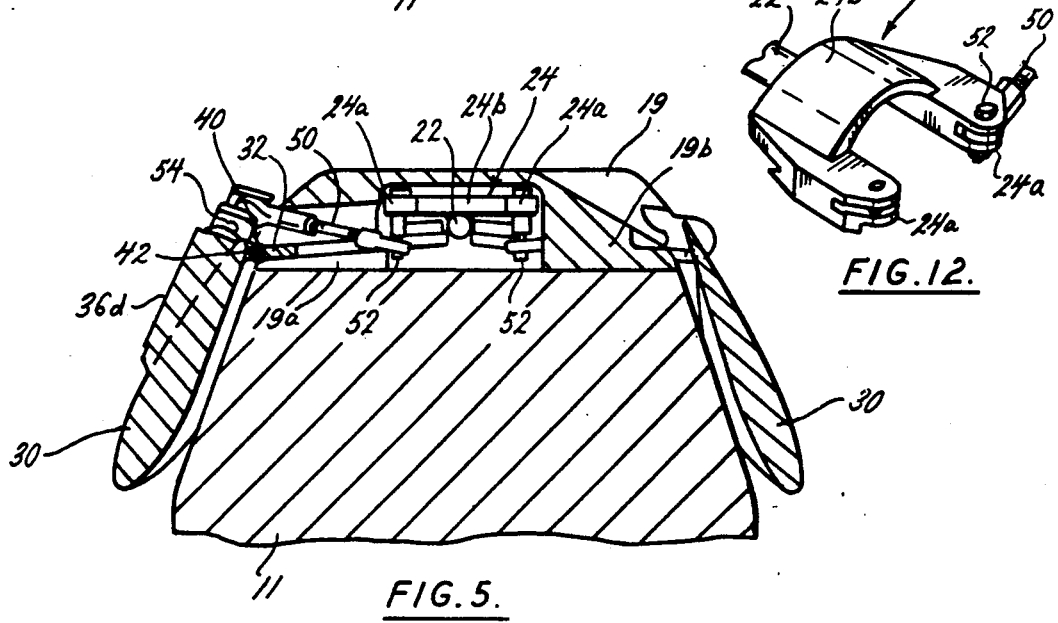
FIG. 5.
FIG. 12.

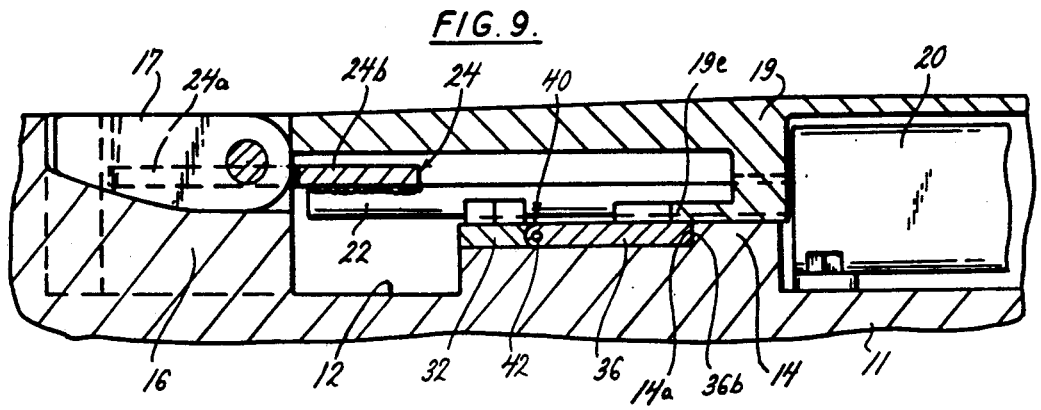
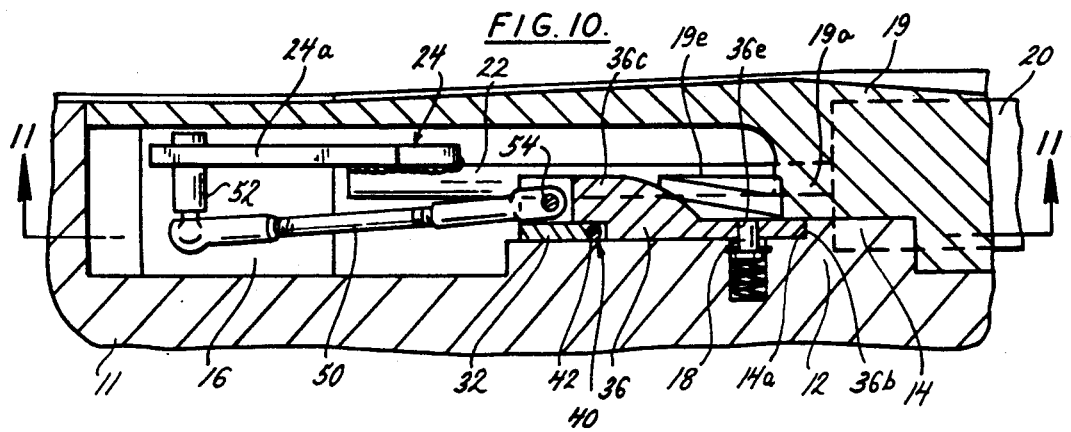
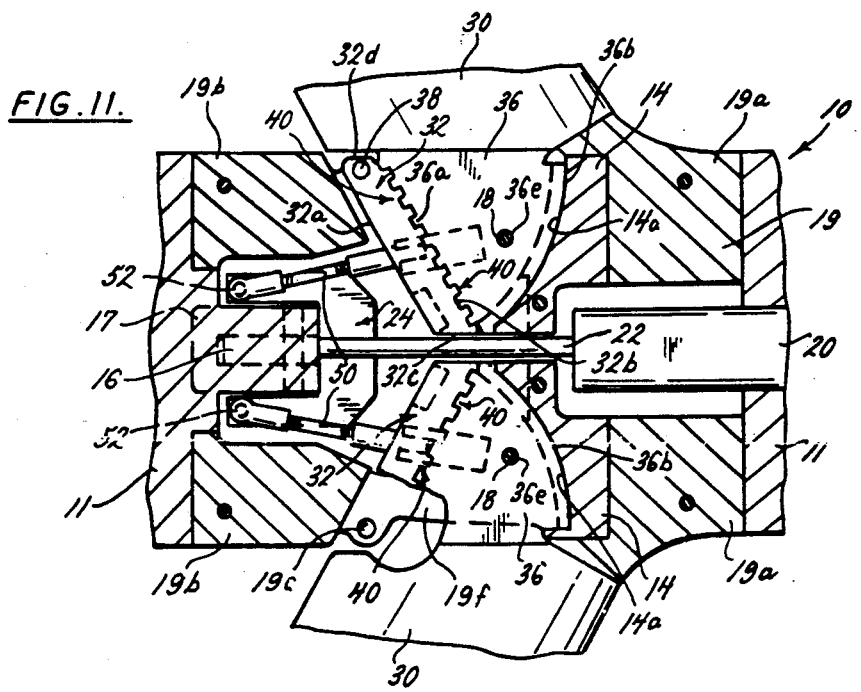

DOUBLE-PIVOTING DEPLOYMENT SYSTEM FOR AEROSURFACES

BACKGROUND OF THE INVENTION

This invention relates to a deployment system for aerosurfaces such as wings or fins.

Aerospace vehicles, such as missiles and rockets, are conventionally provided with wings or fins for lift, flight stabilization, and control. Such laterally or vertically extending aerosurfaces can pose problems of space requirements and drag when they are stowed and carried by aircraft. In order to avoid these disadvantages, many current aerospace vehicle designs employ aerosurfaces which are folded along the vehicle's side or body for storage, handling, and transport, and then deployed outwards to an open, swept position upon launching for flight. For example, U.S. Pat. No. 4,664,339 which issued to Crossfield on May 12, 1987, (hereinafter '339), discloses a side-mounted missile wing which, when deployed, rotates upwardly from the horizontal stowed position into a vertical position. U.S. Pat. No. 3,063,375 which issued to Hawley et al on Nov. 13, 1962, (hereinafter '375), discloses a side-mounted fin folding arrangement which is erected by a rotary movement. For both the '339 and '375 patents, as the aerosurfaces unfold they initially experience airflow normal to the aerosurface which would cause divergence under moderate or high speed airflow and significant structural problems at the root; such an approach could allow air loads to tear the aerosurface off the missile if deployed during flight due to the high bending moments at the root.

U.S. Pat. No. 4,336,914 which issued to Thomson on Jun. 29, 1982, (hereinafter '914), discloses a side-mounted deployable wing assembly having an inner wing segment and an outer wing segment; the inner wing segment is hinged longitudinally to the body of the aircraft while the outer wing segment is hinged by a pin perpendicular to the surface of the wing segments at the junction. This arrangement requires separate mechanisms and complicated cabling to deploy the entire wing assembly—one to pivot and unfold the inner wing segment, and another to deploy the outer wing segment. Such cumbersome arrangement of multiple deployment mechanisms and cables multiple areas of stress concentration; this, in turn, increases the likelihood of inefficiency, low performance, and failure. In addition to requiring complex, costly machining, the outer and inner wing segments in the '914 invention result in a relatively low wing root stiffness due to the joint design; low wing root stiffness is a distinct disadvantage in modern aerospace vehicles which experience high aerodynamic loads and dynamic pressures. Therefore, this type of invention would be severely limited to the flight speeds for which it could be utilized.

Thus, there is a need in the art for aerosurface deployment mechanisms with a minimum number of parts which do not initially open flatwise to the airflow, which have relatively high wing root stiffness, which are deployed with a single mechanism, and which are capable of being used at high in-flight speeds.

SUMMARY OF THE INVENTION

The aerosurface deployment assembly according to the present invention includes a yoke utilized in combination with the carrier interface support structure of an aerospace vehicle. The yoke, operably connected to an actuator, is capable of translational travel substantially parallel to the aerospace vehicle's longitudinal axis. In the preferred embodiment, the actuator is rigidly attached to the aerospace vehicle's support structure.

Each aerosurface in the present invention has an inner segment and an outer segment. Each inner segment is pivotally connected to the support structure at a first axis of rotation substantially perpendicular to the longitudinal axis of the aerospace vehicle. An outer side portion of the inner segment is pivotally connected to an inner side portion of the outer segment at a second axis of rotation which is parallel to the longitudinal axis when the aerosurfaces are in the stowed position; in the preferred embodiment, the pivotal connection at the second axis is achieved with hinge members. Because the inner and outer segments of the aerosurfaces are pivotally connected at the second axis of rotation, rotation of the inner segment about the first axis of rotation has two actions on the outer segment: First, the outer segment initially rotates about the second axis of rotation until the outer segment is substantially parallel to the longitudinal axis of the aerospace vehicle. Second, the outer segment rotates about the first axis of rotation until the entire aerosurface is deployed.

A linkage is employed to transfer motion between the yoke and deployable aerosurfaces. In the preferred configuration, a linkage rod interconnects each deployable aerosurface to the yoke in the following manner: a first end of each linkage rod is pivotally connected to the yoke, and the second end of each linkage rod is pivotally connected to a clevis fitting. The clevis fitting is attached to the forward, inner side portion of the outer segment of the aerosurface.

In operation, the outer segment of each aerosurface is stowed next to the aerospace vehicle body providing a compact aerospace vehicle stowed envelope. In this stowed position, the aerosurface spanwise direction is longitudinally aligned with the longitudinal axis of the aerospace vehicle. From the stowed position, the outer segment is first rotated substantially 90° about the second axis of rotation so that the surface plane of the outer segment is generally horizontal; subsequently, the entire aerosurface is rotated about the first axis of rotation, so that aerosurface span projects outwardly from the body of the aerospace vehicle.

The double-pivoting deployment action disclosed herein allows for a single, smooth aerosurface deployment motion. This invention therefore provides the potential for a high speed, in-flight aerosurface deployment system which, because it employs a single mechanism for deployment, requires minimal machining. Furthermore, due to its simple joints, the system has high root stiffness allowing for operation at high flight speeds.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 4 is a top view of the preferred embodiment of the present invention with the hardback cap shown in partial section about the longitudinal axis of the wing deployment system and with the wings in the stowed, folded position;

FIG. 5 is a sectional view of the preferred embodiment of the present invention looking forwardly in the direction of line 5—5 of FIG. 4;

FIG. 9 is a sectional view of the preferred embodiment of the present invention taken along line 9—9 of FIG. 7;

FIG. 10 is a sectional view of the preferred embodiment of the present invention taken along line 10—10 of FIG. 7;

FIG. 11 is a sectional view of the preferred embodiment of the present invention looking upwardly in the direction of line 11—11 of FIG. 10; and FIG. 12 illustrates an alterative embodiment of the yoke employed in this invention.

DETAILED DESCRIPTION OF THE PREFERRED EMBODIMENT

Figure 1:
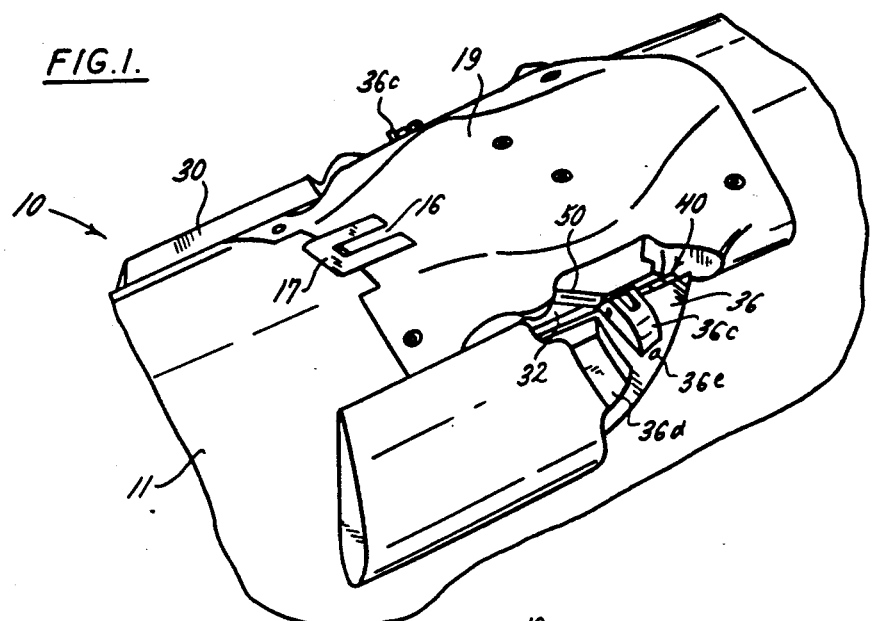
FIG. 1 is a perspective view of the preferred embodiment of the present invention with the wings in the stowed, folded position.
Figure 2:
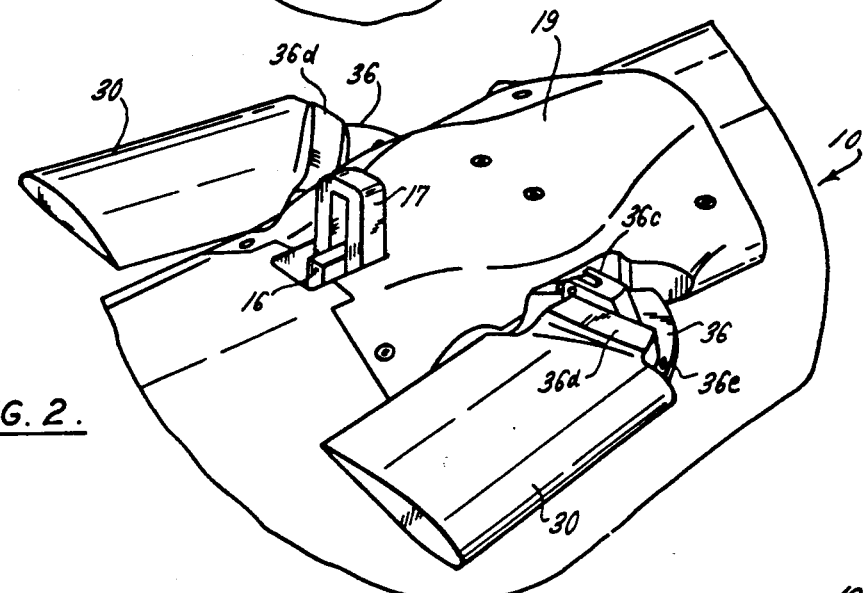
FIG. 2 is a perspective view of the preferred embodiment of the present invention with the wings in the first stage of unfolding during deployment, just prior to rotation about the first axis of rotation.
Figure 3:
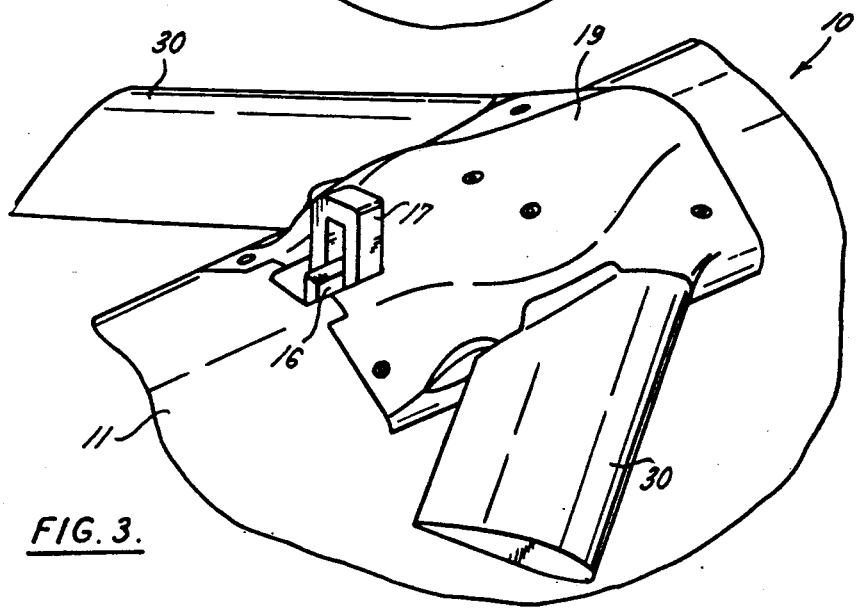
FIG. 3 is a perspective view of the preferred embodiment of the present invention with the wings in the fully deployed, locked position.

A preferred embodiment of the present invention is shown in FIGS. 1-4 on a missile system 10 having a missile body 11, a strongback 12, and a hardback cap 19. As shown in FIGS. 4, 5, 9 and 11, strongback 12 includes raised portions 14 having periphery, curved guide portions 14a. Strongback 12 further includes a base 16 for a launch lug 17 and a pair of spring-loaded locking pins 18.

Actuator 20, which is preferably a pyrotechnic actuator system, is rigidly mounted to strongback 12 and includes pushrod 22 slidably disposed therein. U-shaped yoke 24 includes arms 24a and base 24b; a first end of pushrod 22 is rigidly attached to the central portion of base 24b of yoke 24. Yoke 24 travels translationally in a plane substantially parallel to longitudinal axis 28. In alternative embodiments of this invention, pushrod 22 and yoke 24 can be integrated into a single element. Although yoke 24 in the preferred embodiment is U-shaped, it can be of any configuration which allows translational travel along strongback 12 and to which the interconnecting means discussed below can be pivotally attached.

The apparatus of the present invention further includes wings 30, each of which has an inner wing segment 32 and an outer wing segment 36. Inner wing segment 32 is defined by inner side 32a, outer side 32b, forward end 32c, and aft end 32d. Outer wing segment 36 includes inner side portion 36a and forward curved portion 36b. The periphery of forward curved portion 36b is capable of travel along the complementary curved guide portion 14a of strongback 12. Forward curved portion 36b includes a aperture 36e which is used as a locking feature as dicussed below.

The aft end 32d of inner wing segment 32 is pivotally attached to strongback 12 at a first axis of rotation (not shown) with a pivot pin 38. Outer side 32b of inner wing segment 32 and inner side 36a of outer wing segment 36 are pivotally connected to each other at a second axis of rotation 40 by hinge members 42. A clevis fitting 36c, integrally attached to forward curved portion 36b, extends beyond inner side portion 36a of outer wing segment 36 without attaching to inner wing segment 32.

As shown in FIGS. 4 and 11, linkage 50 interconnects wing 30 and yoke 24 in the following manner: a first end of linkage 50 is pivotally attached to yoke arm 24a at pivot point 52, and a second end of linkage 50 is pivotally attached at pivot point 54 to clevis fitting 36c with monoball fittings. One alternative embodiment of yoke 24 is shown in FIG. 12 wherein linkage 50 is pivotally sandwiched between yoke arms 24a.

Figure 8:
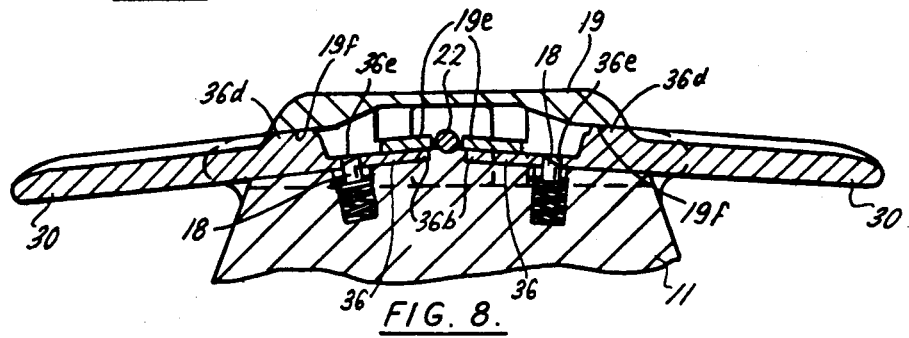
FIG. 8 is a sectional view of the preferred embodiment of the present invention looking forwardly in the direction of line 8—8 of FIG. 7.

As shown in FIGS. 11 and 12, hardback cap 19 includes a forward end 19a, an aft end 19b, a recessed pivot point 19c, an outer wing segment guide 19d, a protruding strongback interface 19e, and a wing root wedge interface 19f. Harback cap 19 is constructed such that it mates to strongback 12 and provides the wing root with a stiff sandwiching joint. Hardback cap 19 interfaces to strongback 12 at forward end 19a, aft end 19b, and also on protruding strongback interface 19e. Outer wing segment guide 19d provides an unobstructed guide path for forward curved portion 36b of outer wing segment 36 during aerosurface deployment. Recessed pivot point 19c provides an additional support point for pivot pin 38. In the fully developed deployed configuration as shown in FIG. 8, wing root wedge 36d interfaces with wing root wedge interface 19f on hardback cap 19 to provide a stiff joint.

Prior to deployment, as shown in FIGS. 4 and 5, pushrod 22 and yoke 24 are fully retracted, and the angle 56 between pushrod 22 and linkage 50 is at its maximum. In this pre-deployed position, wing 30 is folded such that outer wing segment 36 is stowed adjacent to the side of the missile body 11, the surface plane of outer wing segment 36 is substantially parallel to longitudinal axis 28, and second axis of rotation 40 is substantially parallel to longitudinal axis 28.

Upon deployment of actuator 20, as shown in FIGS. 7 through 11, pushrod 22 and yoke 24 are driven in the direction away from actuator 20, and linkage 50 pivots about pivot point 52 as angle 56 becomes increasingly smaller.

Figure 6:
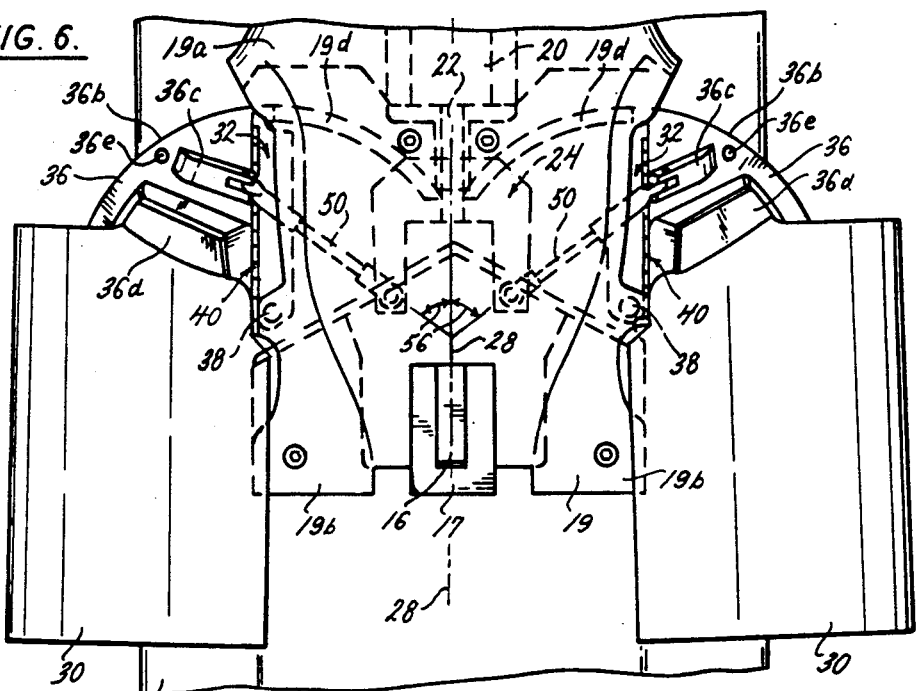
FIG. 6 is a top view of the preferred embodiment of the present invention with the hardback cap removed and shown with the wings in the first stage of unfolding during deployment.

In the first phase of deployment, as shown in FIG. 6, the pulling action of linkage 50 on clevis 36c rotates outer wing segment 36 substantially 90° about second axis of rotation 40 while the surface plane of outer wing segment 36 remains substantially parallel to longitudinal axis 28.

Figure 7:
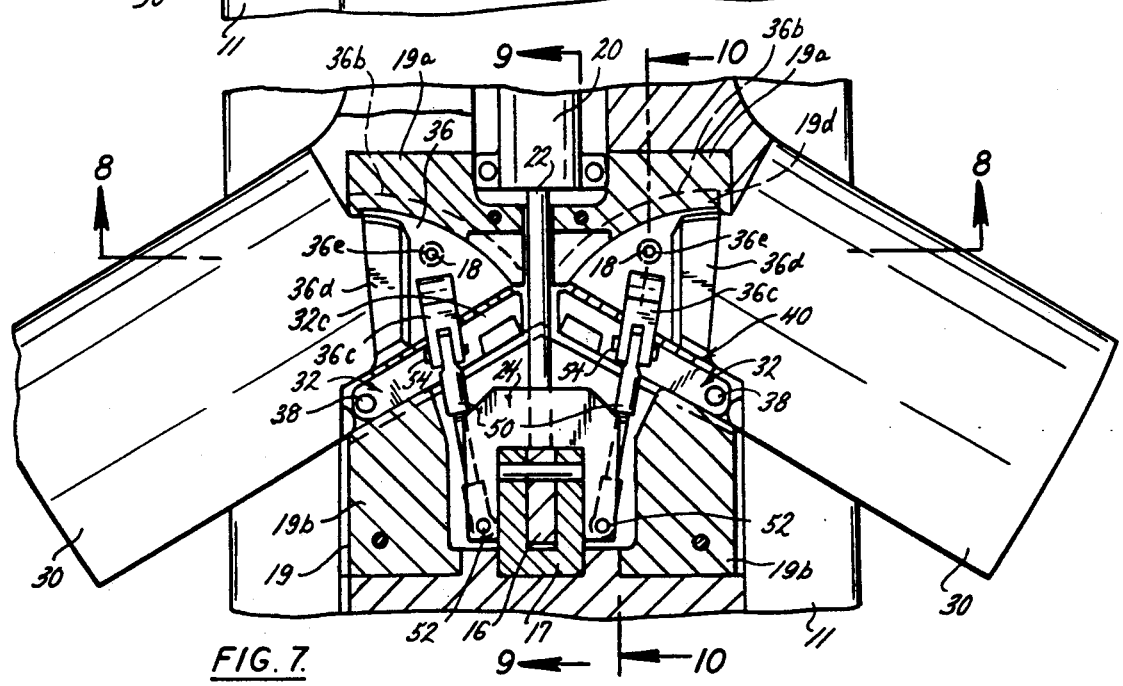
FIG. 7 is a top view of the preferred embodiment of the present invention with a horizontal section taken through a portion of the hardback cap removed and with the wings in the fully deployed position.

In the second phase of deployment, as shown in FIGS. 7 and 8, the continued pulling action of linkage 50 on clevis fitting 36c rotates wing 30 about the first axis of rotation at pivot pin 38 so that the wing span of wing 30 projects outwardly from missile body 11 to the fully deployed position. Due to the hinged arrangement at second axis of rotation 40, the pulling action of linkage 50 on clevis 36c causes the entire wing 30 to rotate about the first axis of rotation at pivot pin 38 to deploy the entire wing assembly 30. During rotation about the first axis of rotation at pivot pin 38, the periphery of both forward end 32c of inner wing segment 32 and the forward curved portion 36b of outer wing segment 36 travel along, and are guided by, the periphery of complementary curved portion 14a of strongback 12. Deployment continues, and angle 56 becomes increasingly smaller, until wing 30 is in the fully deployed position and yoke base 24b contacts launch lug base 16. Upon full deployment, the longitudinal axis of clevis fitting 36c is substantially parallel to longitudinal axis 28. Although contact of yoke base 24b with launch lug base 16 is employed in the preferred embodiment of the present invention, any suitable stopping mechanism may be employed, e.g. a fluid damper and mechanical stop in actuator 20.

Note that both phases of deployment occur with the single translational movement of yoke 24 without requiring a cumbersome arrangement of multiple deployment mechanisms and cables. As such, the invention eliminates multiple areas of stress concentration and provides for a relatively high wing root stiffness.

When wing 30 is completely deployed to the desired flight configuration, the top surface of wing root wedge 36d impacts hardback cap 19 and is locked into place via a galling action of an attached sacrificial material which is either included on wing root wedge 36d or hardback cap 19. This relatively soft sacrificial material is deformed during deployment, provides no root free play, takes out any built-in machining tolerances, and provides a good stiff load path from the wing root to strongback 12 and hardback cap 19.

Finally, as shown in FIGS. 7, 8, 10, and 11, wing 30 is locked in the fully deployed position by engaging locking pin 18 in aperture 36e of outer wing segment 36. Note that any suitable locking mechanism can be employed to retain wing 30 in the proper swept angle position, including a locking provision in actuator 20 itself.

Although the preferred embodiment of the present invention is employed on a missile system, it is readily apparent that the invention herein described is applicable to other aerospace vehicles, such as rockets, projectiles, and the like, which have deployable aerosurfaces. Accordingly, changes and modifications in the specifically described embodiment can be carried out without departing from the scope of this invention which is intended to be limited only by the scope of the appended claims.

What is claimed is:

1. In combination with a support structure of an aerospace vehicle, an aerosurface deployment assembly, comprising:
    (a) an actuating means;
    (b) a plurality of aerosurfaces, each having an inner segment and an outer segment, wherein each said inner segment is pivotally connected to said support structure at an axis of rotation substantially perpendicular to the longitudinal axis of the aerospace vehicle, and wherein an outer side portion of each said inner segment is pivotally connected to an inner side portion of each said outer segment at an axis of rotation parallel to said longitudinal axis when said aerosurfaces are in the stowed position;
    (c) a yoke means, operably connected to said actuating means, for translational travel along said support structure; and
    (d) a plurality of linkage rods for interconnecting said yoke means and said aerosurfaces, wherein a single linkage rod interconnects said yoke means to each said aerosurface, and
    wherein translational travel of said yoke means, initiated by said actuating means, moves said plurality of linkage rods to rotate said aerosurfaces about each of said axes of rotation substantially perpendicular to said longitudinal axis and each of said axes of rotation parallel to said longitudinal axis thereby deploying said aerosurfaces.

2. In combination with a support structure of an aerospace vehicle, and aerosurface deployment assembly, comprising:
    (a) an actuating means;
    (b) a plurality of aerosurfaces, each having an inner segment and an outer segment, wherein each said inner segment is pivotally connected to said support structure at an axis of rotation substantially perpendicular to the longitudinal axis of the aerospace vehicle, and wherein an outer side portion of each said inner segment is pivotally connected to an inner side portion of each said outer segment at an axis of rotation parallel to said longitudinal axis when said aerosurfaces are in the stowed position, wherein each said outer segment of said aerosurface comprises a forward curved portion, and wherein said support structure comprises a curved guide portion, said forward curved portion being capable of travel along said curved guide portion;
    (c) a yoke means, operably connected to said actuating means, for translational travel along said support structure; and
    (d) a plurality of linkage rods for interconnecting said yoke means and said aerosurfaces, wherein a single linkage rod interconnects said yoke to each said aerosurface, and wherein translational travel of said yoke means, initiated by said actuating means, moves said plurality of linkage rods to rotate said aerosurfaces about each of said axes of rotation substantially perpendicular to said longitudinal axis and each of said axes of rotation parallel to said longitudinal axis thereby deploying said aerosurfaces.

3. In combination with a support structure of an aerospace vehicle, an aerosurface deployment assembly, comprising:
    (a) an actuating means;
    (b) a plurality of aerosurfaces, each having an inner segment and an outer segment, wherein each said inner segment is pivotally connected to said support structure at an axis of rotation substantially perpendicular to the longitudinal axis of the aerospace vehicle, and wherein an outer side portion of each said inner segment is pivotally connected to an inner side portion of each said outer segment at an axis of rotation parallel to said longitudinal axis when said aerosurfaces are in the stowed position;
    (c) a yoke means, operably connected to said actuating means, wherein a pushrod connects said yoke means to said actuating means for translational travel along said support structure; and
    (d) a plurality of linkage rods for interconnecting said yoke means and said aerosurfaces, wherein a single linkage rod interconnects said yoke to each said aerosurface, and
    wherein translational travel of said yoke means, initiated by said actuating means, moves said plurality of linkage rods to rotate said aerosurfaces about each of said axes of rotation substantially perpendicular to said longitudinal axis and each of said axes of rotation parallel to said longitudinal axis thereby deploying said aerosurfaces.

4. The deployment assembly as recited in claim 1, further including a means for locking said aerosurfaces in the fully deployed position.

5. The deployment assembly as recited in claim 1, wherein outer side portion of said inner segment is pivotally connected to said inner side portion of said outer segment with hinges.

6. The deployment assembly as recited in claim 1, wherein a first end of each said linkage rod is pivotally connected to said yoke means, and wherein a second end of each said linkage rod is pivotally connected to said outer segment.

7. The deployment mechanism as recited in claim 6, wherein said outer segment of said aerosurface further comprises a clevis fitting near said inner side portion of said outer segment.

8. The deployment mechanism as recited in claim 7, wherein said second end of said linkage rod is pivotally connected to said clevis fitting.

* * * * *